United States Patent [19]
Kumar et al.

[11] Patent Number: 5,230,058
[45] Date of Patent: Jul. 20, 1993

[54] IC CHIP HAVING VOLATILE MEMORY CELLS SIMULTANEOUSLY LOADED WITH INITIALIZATION DATA FROM UNIQUELY ASSOCIATED NON-VOLATILE MEMORY CELLS VIA SWITCHING TRANSISTORS

[75] Inventors: Niraj Kumar, Fremont; Mazin Khurshid, Campbell; John Tran, Sunnyvale, all of Calif.

[73] Assignee: Zilog, Inc., Campbell, Calif.

[21] Appl. No.: 520,777

[22] Filed: May 8, 1990

Related U.S. Application Data

[63] Continuation-in-part of Ser. No. 446,158, Dec. 5, 1989, Pat. No. 5,175,831.

[51] Int. Cl.⁵ .......................................... G06F 12/00
[52] U.S. Cl. ............................ 395/800; 395/700; 395/425; 365/95; 364/933; 364/965.5; 364/967; 364/975.2; 364/DIG. 2; 364/244.6; 364/245.5; 364/247; 364/280.2; 364/DIG. 1
[58] Field of Search ...................... 395/800, 700, 425; 365/95

[56] References Cited

U.S. PATENT DOCUMENTS

| | | | |
|---|---|---|---|
| 4,476,522 | 10/1984 | Bushaw et al. | 395/425 |
| 4,646,269 | 2/1987 | Wong et al. | 365/95 |
| 4,694,431 | 9/1987 | Miyamura et al. | 365/95 |
| 4,751,636 | 6/1988 | Sibley | 395/425 |

FOREIGN PATENT DOCUMENTS 56-147215 11/1981 Japan.
1-293414 11/1989 Japan.

*Primary Examiner*—Thomas C. Lee
*Assistant Examiner*—Paul Harrity
*Attorney, Agent, or Firm*—Majestic, Parsons, Siebert & Hsue

[57] ABSTRACT

Initial data and/or control bits of registers within a digital integrated circuit are simultaneously loaded from localized non-volatile memory cells provided as part of the circuit. Such loading is accomplished each time the circuit is initialized, such as when power is first turned on to a system in which the circuit is a part. An important use of this technique is with a computer peripheral circuit chip such as a serial communications controller.

4 Claims, 3 Drawing Sheets

IC CHIP HAVING VOLATILE MEMORY CELLS SIMULTANEOUSLY LOADED WITH INITIALIZATION DATA FROM UNIQUELY ASSOCIATED NON-VOLATILE MEMORY CELLS VIA SWITCHING TRANSISTORS

CROSS-REFERENCE TO RELATED APPLICATION

This is a continuation-in-part of application Ser. No. 07/446,158, filed Dec. 5, 1989, now U.S. Pat. No. 5,175,831.

BACKGROUND OF THE INVENTION

This invention relates generally to the initialization of digital electronic circuits and, more specifically, to a technique of loading initial data and/or a control bits into registers of digital circuits.

Digital circuits of almost every type generally include small amounts of volatile register memory that is regularly used as part of the operation of the circuit. The registers may be used for temporary storage of data that is being routed through the circuit, or to control operation of a part or all of the circuit, or both. The registers may be physically positioned together in an implementation of a particular digital circuit, or may be distributed throughout that circuit. In any event, the registers must be loaded with initial values in order to begin operation of the circuit. An example of when this is necessary is when power is first turned on to the circuit.

An example of where such digital circuits are utilized is in a computer system. A computer system is made up of many individual integrated circuit chips that are interconnected by bus and control lines. Typically, a computer system includes a microprocessor (CPU) chip, one or more non-volatile and/or read-only-memory (ROM) chips, one or more volatile random-access-memory (RAM) chips, and a plurality of chips for communicating with various peripherals such as a computer system keyboard, modem, printer, monitor, disk drive, and the like. Each of these peripheral communication chips usually includes a number of registers which need to be loaded with initial data and/or control bits when power is first turned on to the computer system or when the system is desired to be initialized for some other reason.

The current predominant technique for doing so involves maintaining the initial values for each register in the computer system memory, such as in ROM or in disk storage. Upon the computer system being initialized, the CPU then transfers each register's data and/or control bits from such storage to the peripheral registers, one at a time. The registers of one peripheral circuit are loaded, and then those of others are loaded, one at a time. These transfers each take a significant amount of time and thus results in a lengthy execution of an initialization program in complex computer systems.

Therefore, it is primary object of the present invention to provide a simplified and faster initialization technique and circuits for carrying it out.

SUMMARY OF THE INVENTION

Briefly and generally, the present invention employs non-volatile and/or read-only-memory as part of each individual circuit for storing the initialization data and/or control bits of that circuit's registers. Upon initialization, that information is then transferred from this memory into each of the registers. This is particularly advantageous in a computer system since this loading can be accomplished much faster from local memory in each circuit instead of having to transfer the initial data from system memory. Each system transfer involves a number of individual steps under the control of the system CPU, while fewer steps are required to transfer data to the circuit registers from local memory. This technique also allows the simultaneous initialization of the registers of a number of circuits, thus further speeding up the process. Further, the technique of the present invention eliminates the need for system memory to be devoted to storing these initial values.

Additional objects, features and advantages of the present invention will become apparent from the following description of its preferred embodiments, which description should be taken in conjunction with the accompanying drawings.

DESCRIPTION OF A PREFERRED EMBODIMENT

Figure 1:
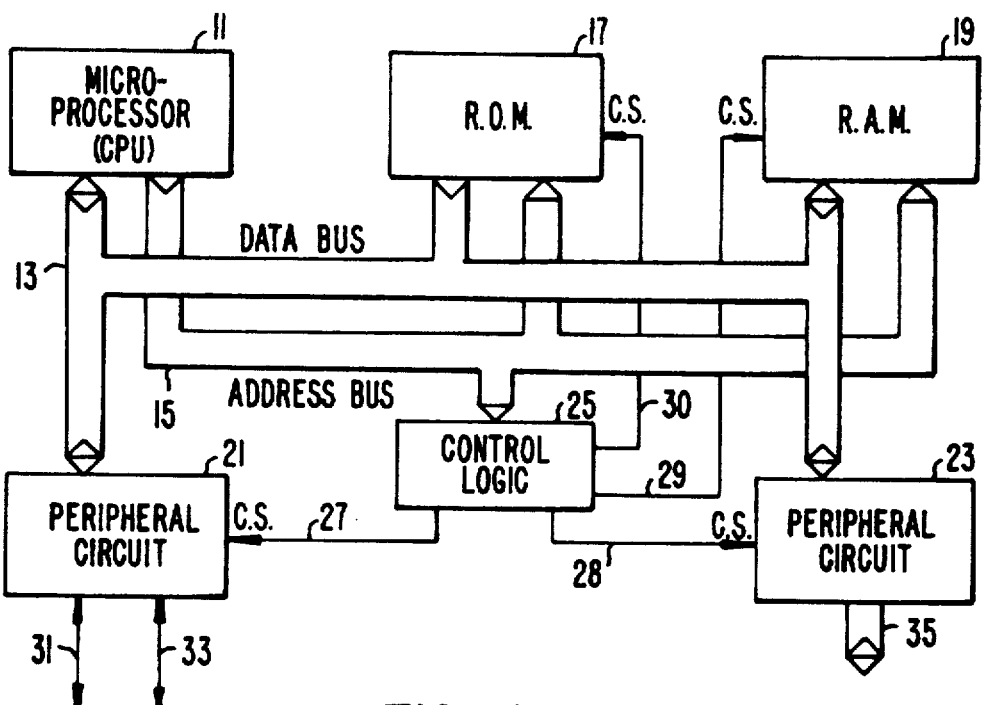
FIG. 1 is a block diagram of a computer system, an example of an environment in which the improvements of the present invention can be employed.

Referring initially to FIG. 1, a computer system having a microprocessor (CPU) 11 is illustrated. A data bus 13 and an address bus 15 interconnect the CPU 11 with other computer system components. These include a non-volatile and/or read-only-memory (ROM) 17 and some volatile random-access-memory (RAM) 19.

In order to communicate with the outside world, several peripheral communications circuits are used, two such circuits 21 and 23 being included in the system of FIG. 1 as an illustration. Control logic 25 decodes addresses on the address bus 15 and enables one of the system circuits by an appropriate chip select signal in one of the control lines 27–30. Of course, any computer system includes a number of control and status circuits not shown in the simplified example of FIG. 1. Also, the functions of the separately shown data bus 13 and address bus 15 are often combined in a single physical bus that is time shared for data and address functions.

The purpose of FIG. 1 is to illustrate a computer system in which the improved initialization techniques of the present invention are implemented in its peripheral circuits. The peripheral control circuit 21 can be, for example, a serial communications controller that operationally connects one or more serial data peripheral ports with parallel data on the data bus 13. In the example being described, the circuit 21 is a two-channel device, providing separate serial data input-output ports 31 and 33. Each of these ports can be connected to an individual peripheral device such as a printer, a modem, and the like, which have a serial data input-output connection.

The second peripheral circuit 23 is shown in FIG. 1 to be of a type that has a parallel data output 35. Of course, the types of peripheral circuits that are utilized depend upon the precise computer system configuration desired. Disk drive and graphics controllers are two types of peripheral circuits that have not yet been mentioned. Each of the blocks 11, 17, 19, 21 and 23 of the FIG. 1 computer system are most commonly configured from one or more separate integrated circuit chips distinct from the others but increasing integrated circuit density is leading to the combining of some of these functions on a single chip.

Figure 2:
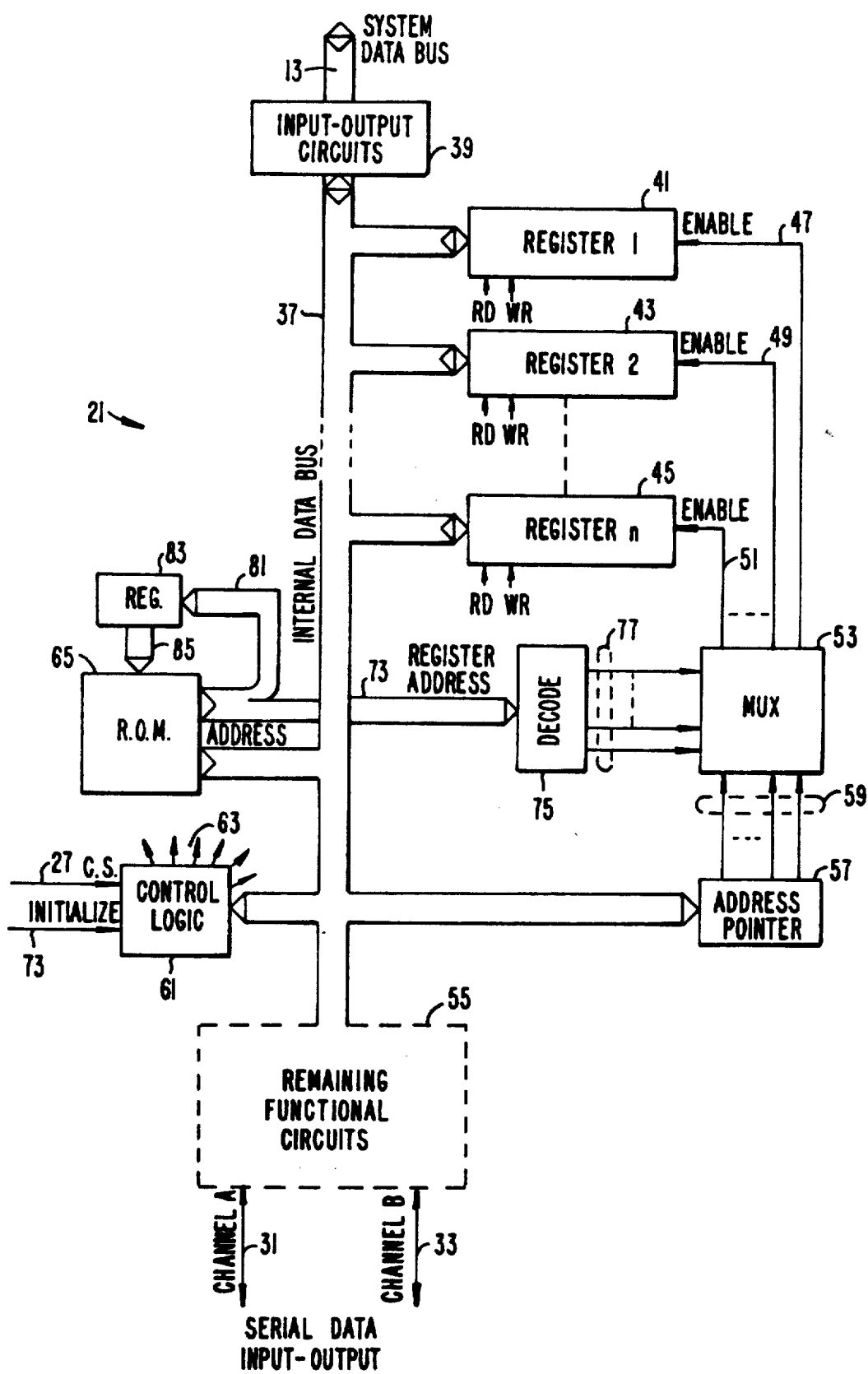
FIG. 2 is a schematic diagram of a peripheral circuit of the computer system of FIG. 1 according to a first embodiment of the present invention.

In order to illustrate a first embodiment of the present invention in some detail, the peripheral circuit 21 of FIG. 1 is shown in a block diagram form in FIG. 2, as an example. A data bus 37 is internal to the circuits of the chip 21 and communicates with the system data bus 13 through appropriate input-output circuits 39. The circuit of FIG. 2 includes a plurality of temporary data storage registers 41, 43 . . . 45. Any number of registers can be initialized by the technique of the present invention. Typically, such a peripheral circuit will have 16 or 20 such registers. Each of the registers is connected with the internal data bus 37 and has individual enable control lines 47, 49 . . . 51 connected to a multiplexing (switching) circuit 53. A proper signal in one of the lines 47, 49 . . . 51 enables the register to which that line is connected to read data to or write data from the internal data bus 37.

The registers shown in the circuit of FIG. 2 function along with remaining operational circuits 55 to process and communicate data between the system data bus 13 and the two serial data input-output ports 31 and 33. The registers are illustrated separately from the rest of the functional circuits connected to the internal data bus 37 since it is these registers that are initialized according to the inventive technique described below.

Before describing this technique, however, the standard way that data is written into and read from the registers 41, 43 . . . 45 during normal operation of the circuit is explained. An address decoding circuit 57 is connected to the internal data bus 37. When the system CPU 11 responds to an instruction to read or write a particular one of the registers, a unique address for that register is sent by the CPU to the data bus 37. When that address is received by the decoding circuits 57, a register enable signal is generated in one of the individual circuits 59 that is connected through the multiplexer 53 to the desired register. While that register is enabled, the CPU 11 subsequently sends data to the bus 37 to be written into the enabled register or reads data from that register. Control circuits 61 that are connected to the internal data bus 37 and to various control and status lines of the computer system assist in this operation. The control logic 61 is illustrated generally to have a number of individual control output circuits 63, two of which are read (RD) and write (WR) signals that are connected to each of the registers in order to control whether a read or write operation on the selected register is to be performed.

When the computer system of FIG. 1 is initialized, each of the registers in FIG. 2 generally must be programmed with an initial set of data and/or a control word. The most common need for such initialization is when power is first turned on to the computer system after it has been off for a time. The usual technique is for the CPU 11 to write a data word into each of the registers from the ROM 17 or external disk storage, one at a time. It can be seen that this involves a number of steps to load each register. The initial data must first be located and read out of computer system memory, the destination register accessed and then the initial data written into the register. This series of steps is accomplished for each of the registers of the peripheral unit 21 until each register is loaded, and then the CPU 11 proceeds to do the same thing for each other peripheral or other register containing circuit of the computer system.

The improvement of this invention, according to the first embodiment illustrated in FIG. 2, is the storage of the initial register data and/or control bits in a non-volatile and/or read-only memory (ROM) 65. The memory 65 is preferably a mask programmed ROM, using a single or multiple mask layers, but can alternatively be non-volatile EPROM or EEPROM.

Figure 3:
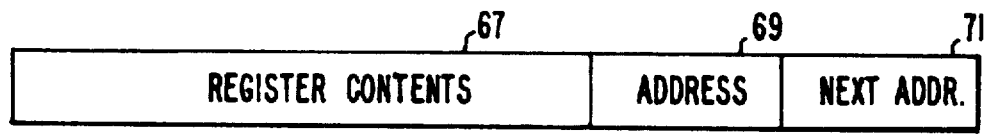
FIG. 3 shows data content of a memory of FIG. 2.

The form of the digital information stored in the ROM 65 for each of the registers 41, 43 . . . 45 is illustrated in FIG. 3. A major component of the digital information is initial data and/or control bits 67 that are to be stored in a designated register. Another component is a series of bits 69 that specify the address of the register into which the initial data 67 is to be written. Another component of this information, according to a preferred implementation, is a next address within the ROM 65 of the digital information that is to be next accessed from the ROM 65 for initializing the next register in order.

As a result, in response to an initialization signal in a line 73 from the computer system, the process of loading the registers one at a time is commenced. Either the CPU 11 or a portion of the control logic 61 designates the first ROM 65 address to be read. The initial data bits 67 (FIG. 3) at that ROM address is then read onto the internal data bus 37 and is available to each of the registers. The one register that is enabled is specified by its address component 69 (FIG. 3) of the digital information located at that ROM 65 address. That register address is read onto an internal address bus 73. That address is decoded from the bus 73 by a circuit 75 and one of the register enable lines 77 is activated. That activated line is communicated through the multiplexer 53 to enable a single one of the registers corresponding to the address 69 that has been read onto the address bus 73. The initial data 67 on the internal data bus 37 is then written into the designated register.

It will be noted that register initiation by the system of FIGS. 1-3 utilizes data bus and register enable lines that are already in place and necessary for the functional operation of the circuit. The multiplexer 53 allows these lines to be connected to either the address decoding circuits 57 for such normal operation, or to the decoding circuit 65 for the initialization operation. This switching of the multiplexer 53 is accomplished by a control signal in a circuit (not shown) from the control logic 61. The initialization process is accomplished with very few sequential steps being necessary to initialize each register.

After the first register is loaded, either the CPU 11 or a control sequence within the logic 61 will cause the ROM 65 to be addressed in order to read out the data and/or control word 67 and register address 69 for the next register in order. There are various ways that the ROM 65 address can be incremented to this new location, including the use of an address counter or the designation of that address by the CPU 11. A preferred alternative technique illustrated in FIGS. 2 and 3 is the use of the next register address data bits 71 (FIG. 3) which are read out onto a separate portion 81 of the internal address bus when the initial data for the first register is read out of the ROM 65. At that time, this next ROM address is stored in a temporary register 83. Thus, the next ROM 65 address exists at its address input 85 and will read out the digital information in the format of FIG. 3 for the next designated register. This technique makes it very simple, fast and free of errors to step through the various ROM 65 addresses for loading the registers one at a time with their initial data and/or control word from the initialization program.

It is preferred that each peripheral and other circuit chip of a computer system that needs such initialization have its registers loaded simultaneously, thus greatly speeding up the overall system initialization. Microcode can be provided in a straight forward manner as part of the control logic 61 in order to control downloading the initial bits from the ROM 65 to the various registers in the manner discussed above. The process begins in response to detection of a system initialization instruction from the system CPU 11 over the system data bus 13.

Figure 4:
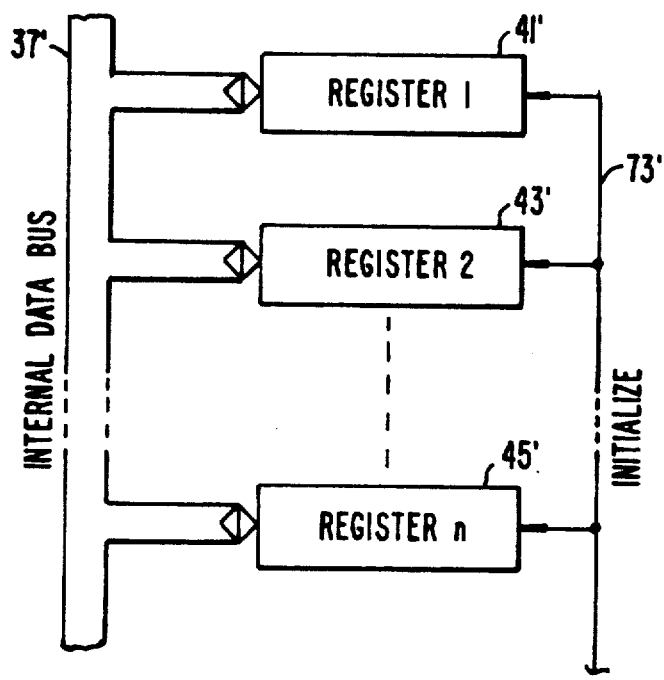
FIG. 4 illustrates a circuit register arrangement according to a second embodiment of the present invention.

In order to illustrate a second embodiment of the present invention, FIG. 4 illustrates a modification of the peripheral circuit 21 shown in FIG. 2, corresponding elements being identified with the same reference number having a prime (') added. In this embodiment, the initial values for the volatile registers are stored in ROM cells that are provided as part of the configuration of the registers. That is, for each one bit register RAM cell, there is provided a non-volatile and/or ROM cell that is permanently programmed with a 0 or 1 corresponding to the initial value to be loaded into its associated register cell. This technique has the advantage that all of the registers of a given integrated circuit chip may be initialized at the same time in response to a single control signal in an initialization circuit 73'.

The separate ROM 65 of the FIG. 2 embodiment is eliminated since its initial value cells are distributed with the temporary registers that they are provided to initialize. The internal data bus 37' need not be used for the initialization process. The register decoding circuit 75 and multiplexer 53 of FIG. 2 are also unnecessary for the second embodiment of FIG. 4.

Figure 5:
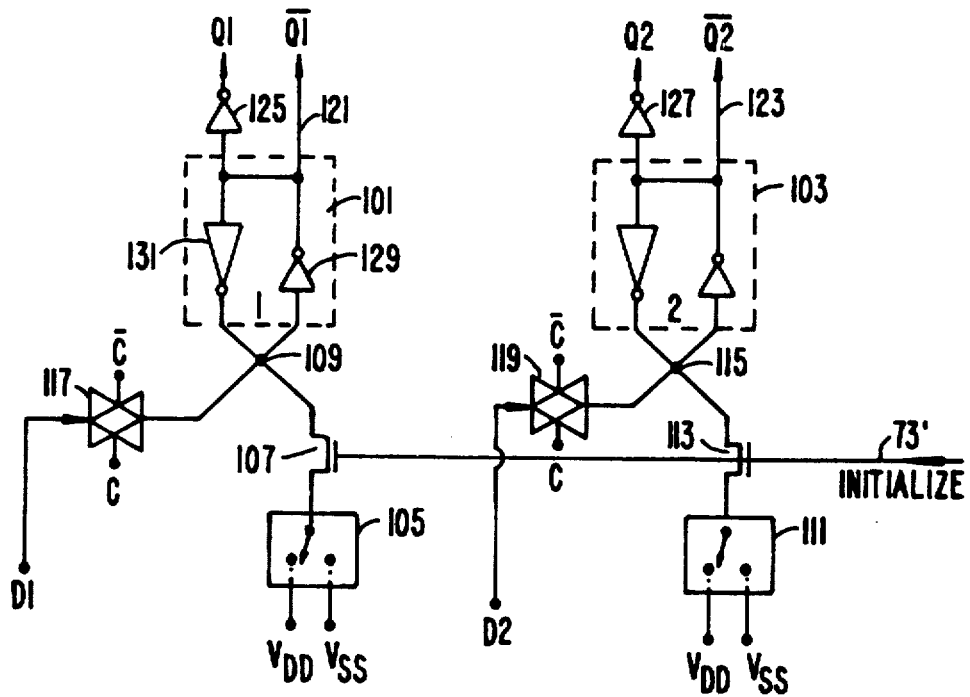
FIG. 5 is a circuit diagram of two exemplary memory cells of the registers of FIG. 4.

Referring to FIG. 5, a preferred circuit implementation of this second embodiment is illustrated. Two static, volatile register cells 101 and 103 are shown as exemplary. Each individual register is likely to have a large number of such cells, such as 16 or 32, but can have less, as few as a single cell, depending upon the architecture of the circuit in which it is utilized. Each register cell has its own ROM cell connected directly to it. A ROM cell 105 is connected through a switching transistor 107 to an input node 109 of the register cell 101. Similarly, a ROM cell 111 is connected through a switching transistor 113 to a node 115 of the second register cell 103. Both register cells 101 and 103 are loaded with the value stored in their respective ROMs 105 and 111 upon the initialization control signal line 73' going active. This initialization signal simultaneously turns on switching transistors 107 and 113 to transfer the values in the ROMs 105 and 111 to their respective register cells 101 and 103.

The ROMs 105 and 111 are preferably programmed by appropriately configuring one or more mask layers used to fabricate the integrated circuit chip utilizing this circuitry. Thus, the ROM cells 105 and 111 of FIG. 5 are shown to simply be programmable by connection of their respective switching transistors to either the high circuit voltage bus $V_{DD}$ or the low voltage bus $V_{SS}$. Alternatively, however, non-volatile EPROM or EEPROM devices can be utilized.

The circuit of FIG. 5 also shows the normal operable inputs D1 and D2 connected to respective input nodes 109 and 115 of the register cells 101 and 103 through respective switching circuits 117 and 119. Similarly, each cell has a respective output 121 and 123, with complementary outputs driven by use of respective inverters 125 and 127.

Each of the register cells 101, 103 . . . can be of any type usually employed for that purpose. It is usually desired that the register cells, although volatile, be of a static type. A preferred static RAM cell structure is illustrated for the register cells 101 and 103 in FIG. 5. Looking at register cell 101 as an example, a strong inverter 129 has its input connected to the cell input node 109 and its output becomes the output 121. A weaker feedback inverter 131 is oppositely connected, as illustrated. The strength of the feedback inverter 131 is enough to maintain the cell 101 in a static state, but yet not so strong to prevent switching that state by driving the input node 109 to an opposite voltage either upon initialization when connected to the ROM cell 105, or during normal operation when an opposite bit value is applied to its input D1. Such a static RAM cell is disclosed in detail in co-pending application Ser. No. 449,561, filed Dec. 12, 1989, which disclosure is expressly incorporated herein by this reference.

Figure 6:
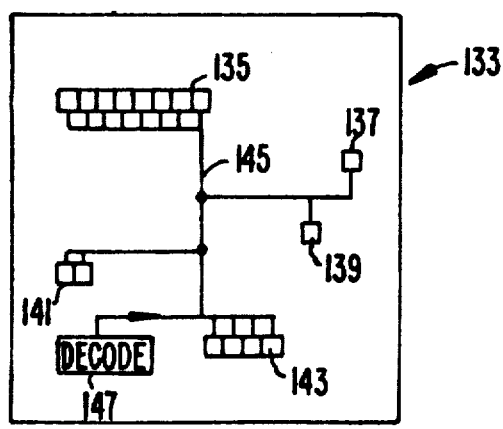
FIG. 6 illustrates an advantageous layout of register memory cells that utilizes the second embodiment of the present invention.

Referring to FIG. 6, the flexibility of the second embodiment described with respect to FIGS. 4 and 5 becomes apparent. FIG. 6 shows a top view of an integrated circuit chip 133. The circuit illustrated has a number of registers 135, 137, 139, 141 and 143 positioned in different locations of the circuit. The registers are of different size, the register 135 containing eight cells, for example, and the register 139 containing a single cell. In each case, a register cell also includes a ROM cell associated with it. The values of the associated ROM cells are transferred to their respective register RAM cells upon a control signal in an initialization line 145. The initialization control signal is generally decoded by appropriate circuits 147 from an internal data bus of some type.

Although the present invention has been described with respect to its preferred embodiments, it will be understood that the invention is to be protected within the full scope of the appended claims.

It is claimed:
1. An integrated digital electronic circuit chip, comprising:
 a plurality of volatile memory cells having at least one non-adjacent volatile memory cell which is laid out on an active surface of said chip in such a manner that said non-adjacent volatile memory cell is not adjacent to any other of said plurality of volatile memory cells,
 a plurality of non-volatile memory cells, equal in number to said plurality of volatile memory cells, each of said non-volatile memory cells being uniquely associated with one of said plurality of volatile memory cells to form a memory cell pair and programmed with an initial value for said associated volatile memory cell, and means connected to each of said memory cell pairs for simultaneously loading said initial values from said plurality of non-volatile memory cells into said plurality of volatile memory cells; wherein said loading means includes a plurality of switching transistors, each of said plurality of switching transistors having an individual control element and being connected to one of said memory cell pairs, and said individual control elements of said plurality of switching transistors being connected together in such a manner as to permit simultaneous loading of said plurality of volatile memory cells with their initial values.

2. The circuit chip of claim 1 wherein each of said plurality of switching transistors is laid out on said active surface of said chip in such a manner that each switching transistor is adjacent to both the volatile and non-volatile memory cells of the memory cell pair to which said switching transistor is connected.

3. The circuit chip of claim 1 wherein said plurality of non-volatile memory cells includes at least one non-adjacent non-volatile memory cell which is laid out on said active surface of said chip in such a manner that said non-adjacent non-volatile memory cell is not adjacent to any other of said plurality of non-volatile memory cells.

4. The circuit chip of claim 3 wherein said at least one non-adjacent non-volatile memory cell forms a memory cell pair with said at least one non-adjacent volatile memory cell.

* * * * *